United States Patent
Lam et al.

(10) Patent No.: US 9,309,864 B2
(45) Date of Patent: Apr. 12, 2016

(54) TRANSVERSE AXIS TURBINE WITH CONTROLLABLE DISPLAY

(75) Inventors: Ronald Chun Yu Lam, HK (CN); Chi Hung Louis Lam, HK (CN)

(73) Assignee: Ronald Chun Yu Lam, Hong Kong (HK)

( * ) Notice: Subject to any disclaimer, the term of this patent is extended or adjusted under 35 U.S.C. 154(b) by 709 days.

(21) Appl. No.: 13/198,349

(22) Filed: Aug. 4, 2011

(65) Prior Publication Data
US 2012/0034069 A1  Feb. 9, 2012

Related U.S. Application Data

(60) Provisional application No. 61/370,808, filed on Aug. 5, 2010.

(51) Int. Cl.
*F03D 3/06* (2006.01)
*F03D 3/02* (2006.01)
*F03D 9/00* (2006.01)

(52) U.S. Cl.
CPC *F03D 3/068* (2013.01); *F03D 3/02* (2013.01); *F03D 9/00* (2013.01); *F05B 2220/25* (2013.01); *Y02B 10/30* (2013.01); *Y02E 10/74* (2013.01)

(58) Field of Classification Search
CPC .......... F03D 3/02; F03D 3/068; F03D 9/00; F05B 2220/25; F05B 2240/213
USPC ............ 416/5, 60, 61, 117, 119, 31, 37, 41; 415/118, 4.2, 4.3, 4.4, 4.5, 907, 908; 362/35; 40/431, 441, 473, 502
See application file for complete search history.

(56) References Cited

U.S. PATENT DOCUMENTS

| | | | | |
|---|---|---|---|---|
| 4,074,951 | A * | 2/1978 | Hudson | 415/2.1 |
| 6,000,907 | A * | 12/1999 | Bic | 416/17 |
| 6,037,876 | A * | 3/2000 | Crouch | 340/815.53 |
| 6,265,984 | B1 * | 7/2001 | Molinaroli | 340/815.4 |
| 6,379,115 | B1 * | 4/2002 | Hirai | 416/17 |
| 6,840,738 | B1 * | 1/2005 | Swanberg | 416/17 |
| 6,936,980 | B2 * | 8/2005 | Wang | 315/292 |
| 7,079,042 | B2 * | 7/2006 | Reim | 340/815.45 |
| 7,183,939 | B1 * | 2/2007 | Lo et al. | 340/815.53 |
| 7,413,404 | B2 * | 8/2008 | Chio | 416/17 |
| 7,425,116 | B2 * | 9/2008 | Chang | 416/5 |
| 7,922,452 | B2 * | 4/2011 | Dulcetti Filho | 416/117 |
| 2003/0049124 | A1* | 3/2003 | Liu | 416/5 |
| 2004/0057829 | A1* | 3/2004 | Khan | 416/17 |

(Continued)

FOREIGN PATENT DOCUMENTS

| | | |
|---|---|---|
| CN | 200949788 Y | 9/2007 |
| CN | 201250758 Y | 6/2009 |

(Continued)

*Primary Examiner* — Sean J Younger
(74) *Attorney, Agent, or Firm* — Timothy W. Menasco, Esq.; Harter Secrest & Emery LLP

(57) ABSTRACT

A transverse axis fluid turbine with controllable display components thereof is disclosed. The turbine has a base structure, rotor rotatably attached to the base structure and at least three blades rotatably attached to the rotor. A matrix array of light reflective or emitting elements is mounted on the flat blade surface. The light reflective or emitting elements are controlled by a control unit in such a way that the light reflecting or emitting provides stable still or moving image(s) to its viewer(s) while the turbine is in operation.

10 Claims, 4 Drawing Sheets

(56) References Cited

U.S. PATENT DOCUMENTS

| | | | |
|---|---|---|---|
| 2005/0110729 A1* | 5/2005 | Cok et al. | 345/82 |
| 2006/0210389 A1* | 9/2006 | St-Germain et al. | 415/4.2 |
| 2007/0166148 A1* | 7/2007 | Middleton et al. | 415/118 |
| 2007/0177081 A1* | 8/2007 | Tanaka et al. | 349/114 |
| 2009/0021675 A1* | 1/2009 | Kishioka et al. | 349/106 |
| 2009/0116191 A1* | 5/2009 | Liou et al. | 361/695 |
| 2010/0104417 A1* | 4/2010 | Lee | 415/60 |
| 2010/0143133 A1* | 6/2010 | Bobowick | 416/117 |
| 2012/0121379 A1* | 5/2012 | Chio | 415/4.2 |

FOREIGN PATENT DOCUMENTS

| | | | |
|---|---|---|---|
| DE | 202009002552 U1 | 6/2009 | |
| GB | 2433554 A | 6/2007 | |
| GB | 2466243 A | 6/2010 | |
| JP | 2002135979 A | 5/2002 | |
| WO | 2010012888 A2 | 2/2010 | |
| WO | WO 2010071261 A1 * | 6/2010 | F03D 3/06 |

\* cited by examiner

TRANSVERSE AXIS TURBINE WITH CONTROLLABLE DISPLAY

CROSS-REFERENCE TO RELATED APPLICATIONS

This application claims priority from U.S. Provisional Patent Application No. 61/370,808 filed on Aug. 5, 2010, the teachings of which are incorporated herein by reference.

STATEMENT REGARDING FEDERALLY SPONSORED RESEARCH OR DEVELOPMENT

Not Applicable

NAMES OF THE PARTIES TO A JOINT RESEARCH AGREEMENT

Not Applicable

REFERENCE TO A "SEQUENCE LISTING"

Not Applicable

BACKGROUND OF THE INVENTION

1. Field of the Invention

This application relates to a turbine in fluid, particularly to a turbine with the axis of rotation lying in a plane transverse to the direction of flow of the fluid, with controllable display components on the blades of the turbine.

2. Description of Related Art

Information and advertisements are now an integral part of modern living. Conventional signs and billboards typically have the information prominently displayed on a flat surface. To capture additional attention to the signs and billboards at night time or low light intensity environments, the signs and billboards may be illuminated by external light coming from an artificial light source or by light emitting elements incorporated into the billboards.

Recent advancements in light emitting diodes (or "LEDs") or minute light sources have created many new types of self illuminated advertising—from simple static signage to complex screens where messages or advertising contents can be displayed and controlled.

The effects of advertising are more attractive when the displayed objects are moving. The barber's pole is an example of such advertising.

However, to light up the advertisement and signage, energy is required to produce the light. Furthermore, energy is required to control the display and to set the sign in motion. In existing systems, the energy is typically provided by electric power obtained from the power grid. With current production of electricity relying heavily on fossil fuel, the use of these colorful and eye capturing signage is contributing to the use of non renewable resources. This means that illuminated and moving signs are introducing more carbon and pollution emissions to the atmosphere indirectly and are thus harmful to our environment.

Wind power is regarded as the cleanest source of energy. A wind turbine produces the least amount of carbon and pollution emissions during its entire service life cycle. From the perspective of advertising, it would be ideal if wind turbines can be used to capture non polluting energy and their structural components, such as the blades, can be used to carry illuminated advertising billboards.

The blades of existing longitudinal axis wind turbines typically rotate on a horizontal axis and the shape of the blades is aerodynamically designed to be slender. Although longitudinal axis wind turbines can provide non polluting energy to supply power to signage and display, their form and dimensions make it difficult to incorporate display and signage into the turbine system.

UK Patent Application No. 2466243 has attempted to provide a solution for such a turbine with longitudinal axis with three arrays of LEDs incorporated along the length of one or more blades. However, to provide or reproduce a stable still or moving image using such a system, the LED control becomes very complex, and is not suited for a turbine with a transverse axis.

Furthermore, a transverse axis wind turbine with specially designed oblong and plate-shape blades can suitably be adopted to achieve the purpose of displaying still or moving image as it provides much wider area.

The turbine and the associated system described in the following patent application provide an improved or alternative solution to facilitate environmentally friendly advertisement and signage.

BRIEF SUMMARY OF THE INVENTION

An object of the present invention is to provide an information display system incorporated into a transverse axis turbine system.

Another object of the present invention is to provide a means to control the information displayed while the turbine blades undergo rotation about the transverse axis.

Yet another object of the present invention is to obtain power from the turbine system to power the display system.

According to one embodiment of the present invention, it provides a transverse axis turbine having display elements embedded in the rotating blades of the turbine. The blades are attached radially and rotatably to the rotor shaft. As the turbine rotates, the energy in the flowing fluid is captured by the rotating blade and the mechanical energy is then converted into electricity by a power generation system. The power generated is then used to energize the display system. The display system can also optimize the amount of energy used by turning off the power supply to the display elements on the blade when the blade is not facing the intended viewers.

A large display turbine system can be built by joining transverse turbine modules together. All the blades of the modules will move in a coordinated manner as a group and the displayed message will be controlled by a central control unit.

BRIEF DESCRIPTION OF THE SEVERAL VIEWS OF THE DRAWING

The present invention may be best understood and will become apparent from the following description with referencing to the accompanying drawings.

DETAILED DESCRIPTION OF THE INVENTION

Figure 1:
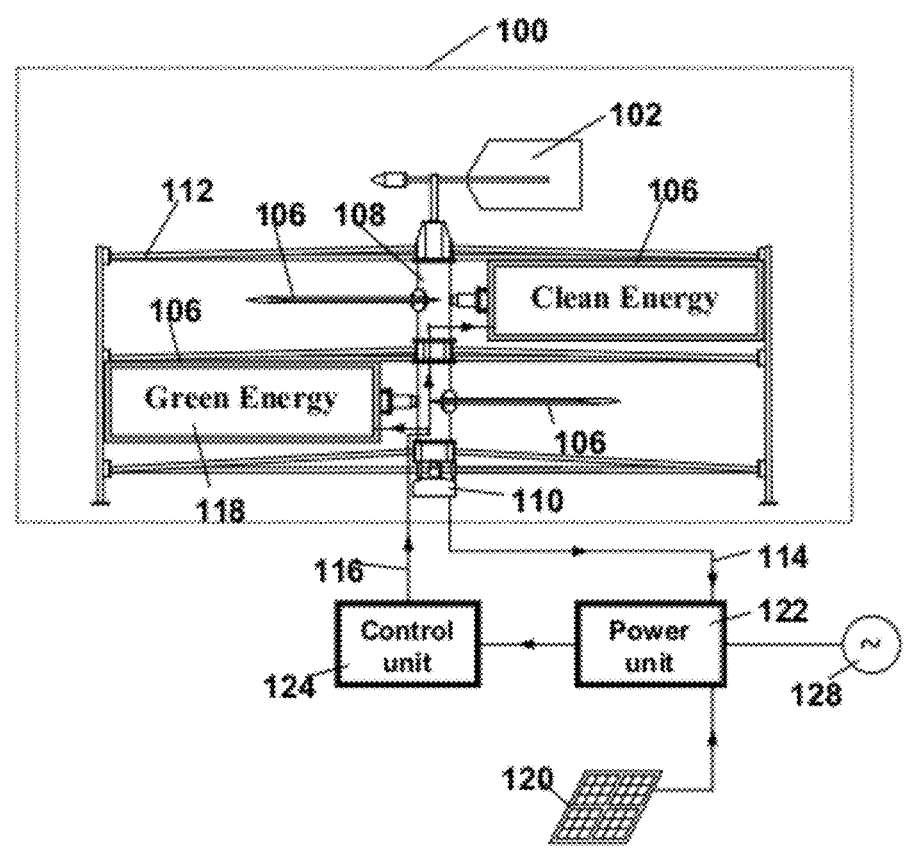
FIG. 1 shows a side plan view of a preferred embodiment of the present invention.

An embodiment of the present invention is illustrated in FIG. 1. A vertical transverse axis turbine 100 with at least three blades 106 radially attached to a center rotor 108 is caused to rotate by fluid flow (for example wind) forces acting on the blades 106. Each blade 106 rotates at its own axis, such that the blade 106 rotates to its standing position (or vertical position) to maximize the blade area against the fluid flow to receive the maximum power from the flow when the blade 106 moving along the direction of fluid flow (not shown), and rotates to its resting position (or horizontal) to minimize the blade area against the fluid flow such that it minimizes the disturbance against the flow when the blade 106 rotates against the fluid flow direction. Such blade rotational movement is controlled by actuating means (not shown) and in accordance with predetermined flow direction or detection of the flow direction detected by the direction vane 102.

The rotating rotor 108 then drives an electric generator 110 to produce electrical power and the power is transmitted to a power control or management unit 122 via electric power cable 114. Alternatively, power unit 122 may receive power from external power source. The power unit 122 provides power to the control unit 124. The control unit 124, with information on the angle and position of each turbine blade 106, control each display element 118 on the blade 106 in a way as designed.

Power to the power management unit 122 can also be supplied by other sources (or external sources) such as from supplementary PV panels 120 mounted on the top of the turbine supporting frame 112 and below the direction vane 102. Power management unit 122 may also provide energy storage functions.

Figure 2:
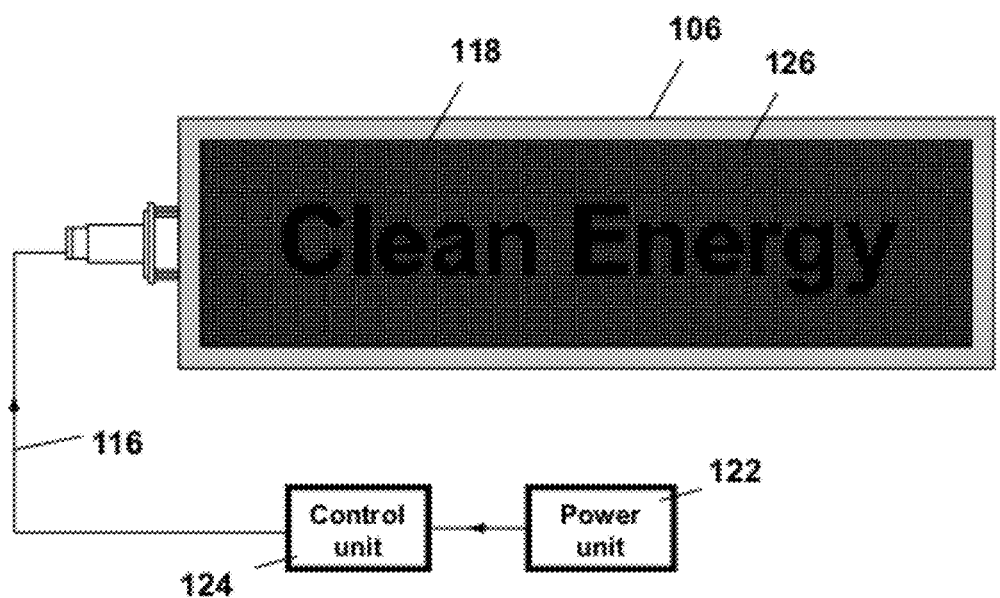
FIG. 2 shows an exemplary embodiment of a blade display unit having the light emitting diode elements on the blade being arranged in a columns and rows array.

The blade member 106 as shown in FIG. 2 has a display component 118, comprising a matrix array of light emitting elements or light reflective elements 126. Each element 126 on the blade 106 can independently be switched on and off or controlled to have varying light intensity by the control unit 124 as the turbine rotates. When the blade 106 is not exposed to the targeted viewers, the light emitting elements 126 are turned off by the control unit 124. As the turbine rotates and the blade 106 is facing the targeted viewers, the control unit 124 turns on the appropriate light emitting elements 126 timely and thus displays the intended message. For example, when the viewers are expected to be around the up-stream of the fluid flow direction or downstream thereof, where the viewers would have complete sight of the entire blade member 106 when the blade member 106 is in the standing (vertical) position, the elements 126 are activated at that particular moment or particular range of rotational angle to provide a stable still or moving graphical image or text to the viewers while the turbine is in operation. The message may be in text form or may be moving graphics as programmed in the control unit 124.

Figure 3:
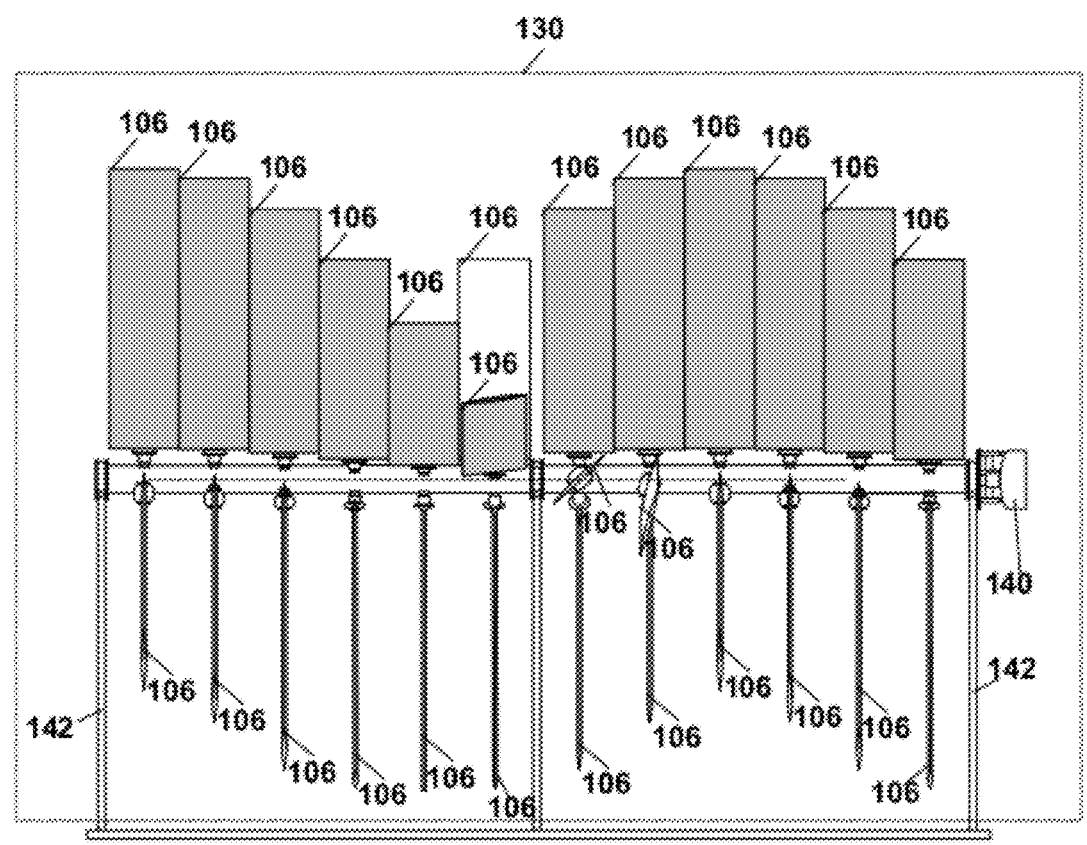
FIG. 3 shows a side plan view of another embodiment of the present invention.

A second embodiment of the present invention is illustrated in FIG. 3. A horizontal transverse axis turbine 130 is mounted in the frame 142, with its axis in a horizontal plane. Electrical power is generated in a similar way as the embodiment shown in FIG. 1, for example, the rotor is in communication with a generator 140 for generating power. And the generated power may be used to energize light emitting elements 126 (not shown) via a control unit 124 similar to that shown in FIGS. 1 and 2. The blades 106 of the turbine are attached to the rotor in adjacent layers. Light emitting elements 126 are installed to the face of selected turbine blades 106 that would be faced to the viewers. The control unit 124 (not shown) controls the lighting status of each light emitting element 126 at appropriate times to produce the advertising message or picture.

Figure 4:
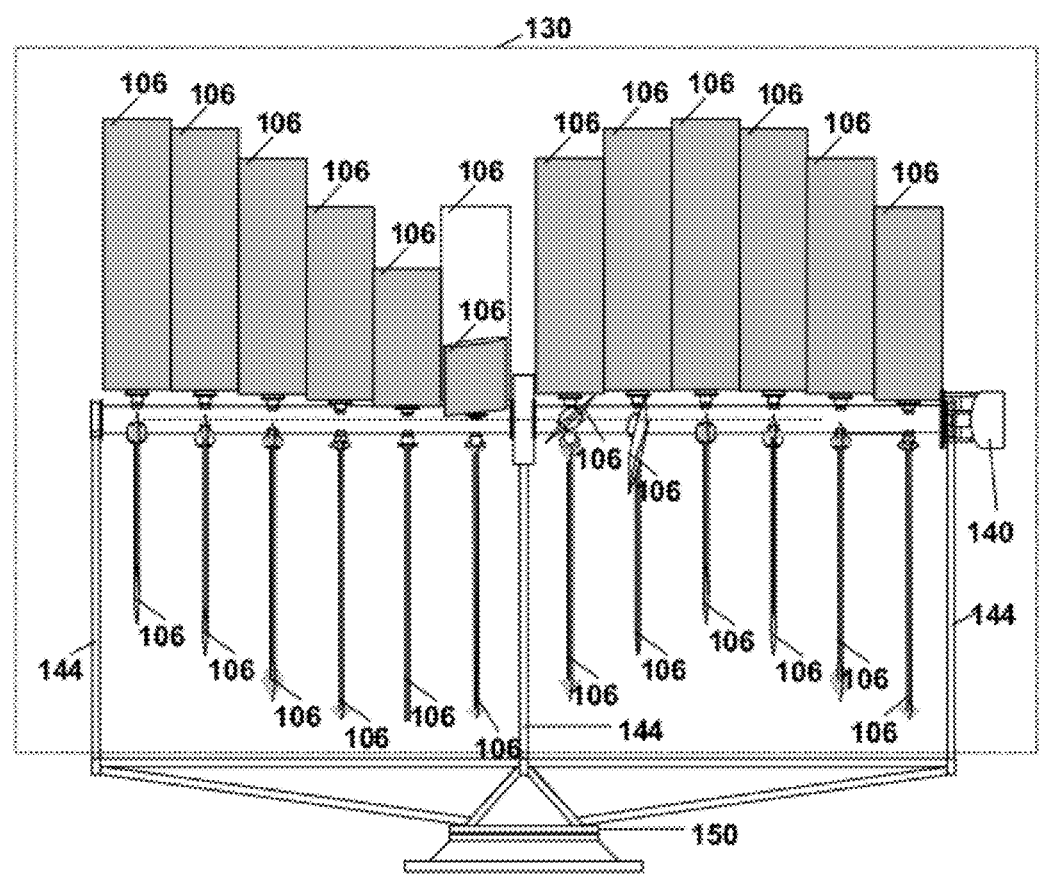
FIG. 4 shows a side plan view of yet another embodiment of the present invention, being mounted on a rotatable platform with wind vanes.

A third embodiment of the present invention is illustrated in FIG. 4. A horizontal transverse axis turbine 130 having a frame structure 144 is mounted on top of a rotatable platform 150. In this embodiment, the turbine 130 is mounted with the axis of rotation horizontally and energy captured from the fluid flow (for example, wind or water flow) may be used to power the controllable light emitting elements 126 (not shown) on the blades in a way similar to the embodiment shown in FIG. 3. The rotatable platform 150 allows the turbine axis to be aligned in a direction perpendicular to the direction of the incoming fluid flow (for example, wind) by the directional vane mounted at the supporting frame columns.

From the description above, a number of advantages of some embodiments of our transverse axis turbine display become evident:

(a) An embodiment of the turbine can be deployed in easily visible area. The turbine in the system can capture significant amount of wind energy to power the illumination for the signage or advertisement.

(b) The use of wind energy to power the signage will effectively reduce the power consumption within a city environment.

(c) Motion of the blade when the turbine is capturing energy will provide additional motion to signage, thus making the sign more attractive.

Accordingly, the reader will see that the transverse axis turbine with controllable display of various embodiments can be used to display messages or signage while effectively harnessing energy from wind to power the display. The embodiment as illustrated in FIG. 1 allows the blade of the turbine to display messages. The messages are controlled by a control unit and can be programmed to display graphics or text. The power for the display and the control unit comes from power captured by the turbine system. The entire turbine display system is to minimize the use of power from the power grid and to provide signage and information using wind or environmentally friendly energy.

In addition to the embodiment outlined in FIG. 1, another embodiment is illustrated in FIG. 3. The resultant system is particularly suitable to capture wind power in certain environments such as at rooftops of high-rise buildings while displaying the graphics and information to a captivated audience.

Utilizing the scalability concept in the transverse axis turbine system, the display system can be constructed in various shapes and be tailored to the environment that the signage is displayed.

While a number of exemplary embodiments of the present invention are shown above, these are merely illustrations of the principle of the present invention and that they should not be construed as limitations on the scope of any embodiment, but as exemplifications of the presently preferred embodiments thereof. Many other ramifications and variations are possible within the teachings of the various embodiments. For example, the blades can be shaped differently from a rectangle shape, such as having an oval, curved bowl shape or any aerodynamically enhanced shape; the turbine can be rotating on axes of various orientations; the programming of the display can be altered remotely or locally. Various modifications can be implemented or made by those skilled in the art without departing from the spirit and scope of the present invention.

The invention claimed is:

1. A transverse axis fluid turbine with a controllable display, comprising:
   a. a base structure;
   b. a rotor rotatably attached to the base structure, the rotor having its axis being transverse to the direction of fluid flow;
   c. at least three blades rotatably attached to the rotor, each blade extends radially from the rotor and rotates about a longitudinal axis of the blade to a vertical position when the blade is moving in the direction of the fluid flow for maximizing the blade surface area to receive the maximum fluid flow energy, and rotates to a horizontal position for minimizing the blade surface area to minimize the resistance when the blade is moving against the direction of fluid flow;
   d. a display component on the surface of the blade, comprising a matrix array of display elements;
   e. a control unit being in communication with display component; and
   f. a power unit being in communication with the control unit and the display component; and
   wherein the control unit controls light intensity of each display element of the display component to provide a stable still or moving image as the blades rotates, and wherein the control unit activates the matrix array of display elements in response to the blade being in a given one of the vertical position or the horizontal position, and deactivates the matrix array of display elements in response to the blade being in a remaining one of the vertical position or the horizontal position.

2. The transverse axis fluid turbine as recited in claim 1 wherein the display elements comprise controllable reflective elements.

3. The transverse axis fluid turbine as recited in claim 1 wherein the display elements comprise light emitting elements or source.

4. The transverse axis fluid turbine as recited in claim 3 wherein the light emitting elements or source are light emitting diodes.

5. The transverse axis fluid turbine as recited in claim 1 wherein the power unit further comprises power generating device in communication with the rotor of the turbine for generating power therefrom.

6. The transverse axis fluid turbine as recited in claim 1 wherein the rotor is extended vertically.

7. The transverse axis fluid turbine as recited in claim 1 wherein the rotor is extended horizontally.

8. The transverse axis fluid turbine as recited in claim 7 further comprising a rotatable platform that rotates the turbine to a fluid flow facing direction.

9. The transverse axis fluid turbine as recited in claim 8 further comprising a directional vane for detecting the fluid flow direction.

10. The transverse axis fluid turbine as recited in claim 1, wherein the control unit controls each display element of the display component to provide a stable still or moving image when viewing the turbine from a direction during a predetermined portion of a rotation cycle of the at least three blades.

* * * * *